United States Patent [19]

Herrin

[11] 3,752,963

[45] Aug. 14, 1973

[54] METHOD OF AND APPARATUS FOR INTERPRETING A CODED RECORD

[75] Inventor: Carlos B. Herrin, Bellbrook, Ohio

[73] Assignee: Monarch Marking Systems, Inc., Dayton, Ohio

[22] Filed: Apr. 12, 1972

[21] Appl. No.: 243,235

[52] U.S. Cl. ...................... 235/61.11 E, 250/219 D

[51] Int. Cl. .......................... G06k 7/10, E04g 17/00

[58] Field of Search .............. 235/61.11 E, 61.11 R; 340/146.3 K; 250/219 D, 219 DC

[56] References Cited

UNITED STATES PATENTS

| | | | |
|---|---|---|---|
| 3,309,667 | 3/1967 | Feissel et al. | 235/61.11 E |
| 3,543,007 | 11/1970 | Brinker et al. | 235/61.11 E |
| 3,643,068 | 2/1972 | Mohan et al. | 250/219 D |

*Primary Examiner*—Daryl W. Cook
*Attorney*—Richard D. Mason, Reginald K. Bailey et al.

[57] ABSTRACT

A machine readable, binary coded record or label includes alternating bars and spaces of different reflectivity in which the widths of the bars and spaces are assigned one of two values representing a binary "1" or a binary "0". This record is scanned by an optical reader having a scanning aperture of known dimensions. When the record is scanned, the widths of the bars and spaces forming a complete code are individually and sequentially determined and stored in bar and space registers. During the scanning, the passage of the reader aperture over the leading or trailing edge of each bar and space results in a reader output signal having a slope related or proportional to the dimension of the aperture. This slope is determined by signal level detectors and is used to store a reference or standard value. This standard or reference value is compared with the stored widths of the individual bars and spaces to determine the 1 and 0 significance of the bars and spaces. In this manner, the establishment of a reference width value based on the scanning aperture size and its effect on the reader output signal renders record interpretation substantially independent of reading speed or apparent bar and space width.

11 Claims, 4 Drawing Figures

PATENTED AUG 14 1973 3,752,963

SHEET 2 OF 2

METHOD OF AND APPARATUS FOR INTERPRETING A CODED RECORD

This invention relates to machine readable codes and records and, more particularly, to a new and improved method of and apparatus for interpreting a record encoded with data in the form of areas of different sizes.

The need for acquiring data at, for example, a point of sale is well recognized, and many attempts have been made in the past to provide records, tags, or labels and reading and interpreting systems that are capable of being used in retail stores at the point of sale and for inventory. In this application, the records must be easily and economically made and must be such that, for example, handling by customers does not deface the coding or render the code incapable of accurate reading. Further, the record should be such that it can be read either by a portable manually manipulated reader or a stationary machine reader of low cost. Further, when the record or label is to be read by a manual reader, it should be such that the record interpretation is as independent of speed of reading as is possible.

Prior approaches to this problem have used sequential areas or bars of different light reflecting characteristics in which bit value is determined by color. These records are expensive to produce and require somewhat more elaborate reading systems than desirable. Other techniques provide codes in bar or stylized character form with magnetic or light reflecting recordings in which absolute values in a dimension such as width are assigned to the different binary weights or values. These codes can be read serially or in parallel. The parallel codes require plural transducers which cannot be easily accommodated in a portable reader, and the magnetic recordings are also not easily read with manual or portable readers. The sequential bars of varying widths are easily read using a single transducer in a portable unit but generally use level detection equipment or individual width timers in the interpreting system which are not easily compensated for variations in the manually controlled speed of relative movement between the reader and the record.

Accordingly, one object of the present invention is to provide a new and improved method of and apparatus for interpreting a coded record.

Another object is to provide a new and improved method of interpreting a coded record in which the width of a code area is assigned an absolute binary value and in which a reference width value based on a known reader aperture size is derived during reading for use as a standard for width comparison with the individual areas.

Another object is to provide a method of and apparatus for interpreting or translating records coded in areas of two different widths by comparing the widths of individual areas with a reference value established during translating by determining the slope of the reader analog output resulting from scanning an area with an aperture of finite size.

A further object is to provide an apparatus for reading records wherein each character is encoded by a combination of areas of two fixed widths and which includes a reader with a scanning aperture of known size, one register for storing the width of an area, another register for storing a standard or reference value based on the effect on the output signal from the reader resulting from the size of the reader aperture, and a means for determining the relation of the stored width to the reference value to establish the code value.

In accordance with these and many other objects, an embodiment of the present invention comprises a record, tag, or label made, for example, of a member having a light reflective surface on which are recorded a plurality of non-reflecting bars. The widths of the non-reflecting bars and the reflecting spaces disposed between and defined by the nonreflecting bars are modulated in width so that a binary 1 is represented by one fixed width, i.e., a wide width, and a binary 0 is represented by another different width, i.e., a narrow width. In one embodiment, each character is represented by a four bit binary code formed by three black or nonreflective bars and the two white bars or spaces separating the three black bars. These records can be easily produced using nothing more than conventional paper or card stock and simple coding elements either individual or in sequence for applying ink or other nonreflective material to the record. The record making apparatus can be such as to sequentially or concurrently record a plural character message, each character comprising a plurality of bits. The message can be preceded and followed by start and stop codes coded in the same manner as the characters of the message.

This record is interpreted by a manually held light pen or reader including, for example, a light source for directing light onto the record and a light responsive element providing a varying output in dependence on the quantity of reflected light received from the record, although this reading assembly could as well be incorporated into a stationary record reading mechanism. The reader has a scanner or scanning aperture of known finite size optically coupling the reader to the record. The record is read by producing relative movement between the reader and the record requiring only that the reader pass across the entire coded message at some point along its length. The analog signal developed by the photoresponsive unit in the reader is applied to a pair of upper and lower level signal amplitude or threshold detectors compensated for average analog signal or pulse height. The upper and lower level detectors are equally spaced with regard to average pulse height. These two detectors control the storage of bar and space widths in a corresponding pair of registers and also control the establishment of a standard or reference value based on the finite size of the scanning aperture of the reader.

To establish the reference value, the effect produced on the leading and trailing edges of the analog signal from the reader resulting from a scanning aperture of finite size is used. A scanning aperture that is infinitely small would produce a square wave transition between white and black levels. The use of an aperture of finite size introduces a slope in the leading and trailing edge of the analog signal which is proportional to the size of the aperture. This slope changes with record reading speed but the change corresponds to the change in apparent width of the stored bar and space widths, to avoid errors in record interpretation.

The slope of the leading and trailing edges is determined by the two level detectors and digitized as a signal whose width varies in dependence on the slope. This signal alternately gates a free running clock into a pair of bar and space standard registers so that bar and space standard values are stored.

The bar and space width values are stored in the bar and space registers using the two level detectors to alternately gate pulses from the free running clock into these two registers. Since, however, the signal representing slope is short in comparison with the width of the code areas, a pulse divider is interposed between the clock signals and the width counters. The pulse divisor is a constant such that the stored reference value (bar or space) lies between the narrow width of the binary 0 and the wider width of the binary 1 in the assumed example. The same result could be obtained by supplying the clock signals directly to the width registers and multiplying the clock signals applied to the standard registers by a similar constant.

The 0 and 1 significance of the width values stored in the bar and space width registers is determined by comparing these values in sequence with the stored standard or reference value based on the reader aperture size. The result of each comparison is shifted into a shift register and transferred to an output or utilization device such as a data handling unit or signaling channel. The space and bar width and standard registers are alternately cleared and used as storage units as successive bars and spaces are read. A program counter is provided to sequence the interpretation of successive characters.

By using as a width reference for comparison with the stored bit widths, a value based on a constant (reader aperture size) which is derived during the reading of the stored widths, variations in reading speed, for instance, cause like and proportionate changes in the reference values and the bit widths, and velocity errors are eliminated. Further, this is accomplished without adding to the basic code.

Many other objects and advantages of the present invention will become apparent from considering the following detailed description in conjunction with the drawings in which.

Figure 1:
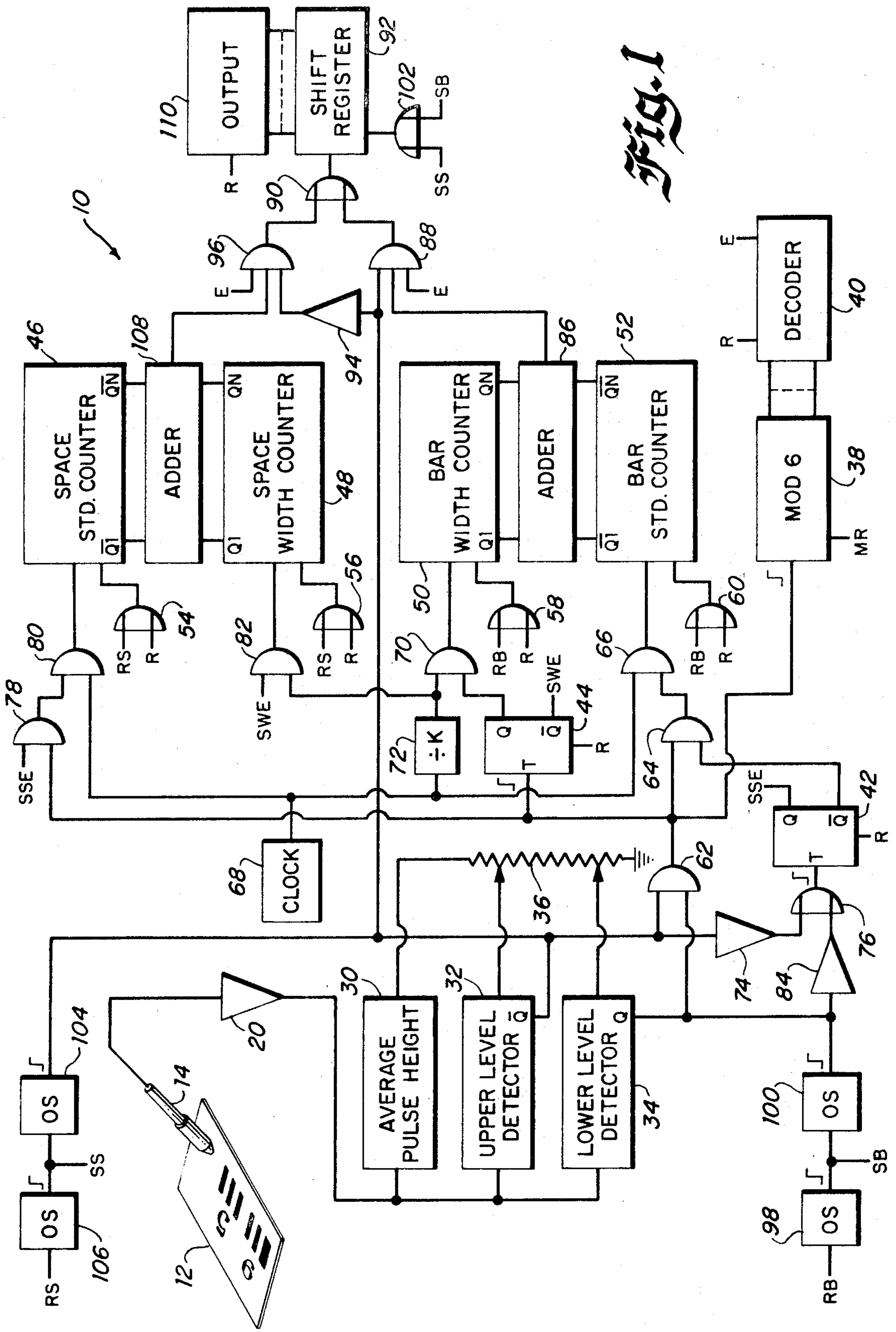
FIG. 1 illustrates a record in conjunction with a reader and interpreting circuit which embodies the present invention and which is shown in simplified block and logic diagram form.

Referring now more specifically to FIG. 1 of the drawings, therein is illustrated a system indicated generally as 10 for interpreting a bar coded record 12. In the coding used on the record 12, the widths of the bars and spaces varies in accordance with the bit value to be encoded so that when relative movement is produced between the record 12 and an optical reader 14, the apparent width varies in dependence on the speed of relative movement. In accordance with the present invention, the system 10 includes means for establishing a reference value or width during the actual scanning of the record 12 by the reader 14 against which the widths of the bars and spaces can be compared so that the true binary significance of the encoded data can be accurately determined substantially independent of reading speed and without requiring additional indicia over and above the usual bar code on the record 12.

Figures 2, 3:
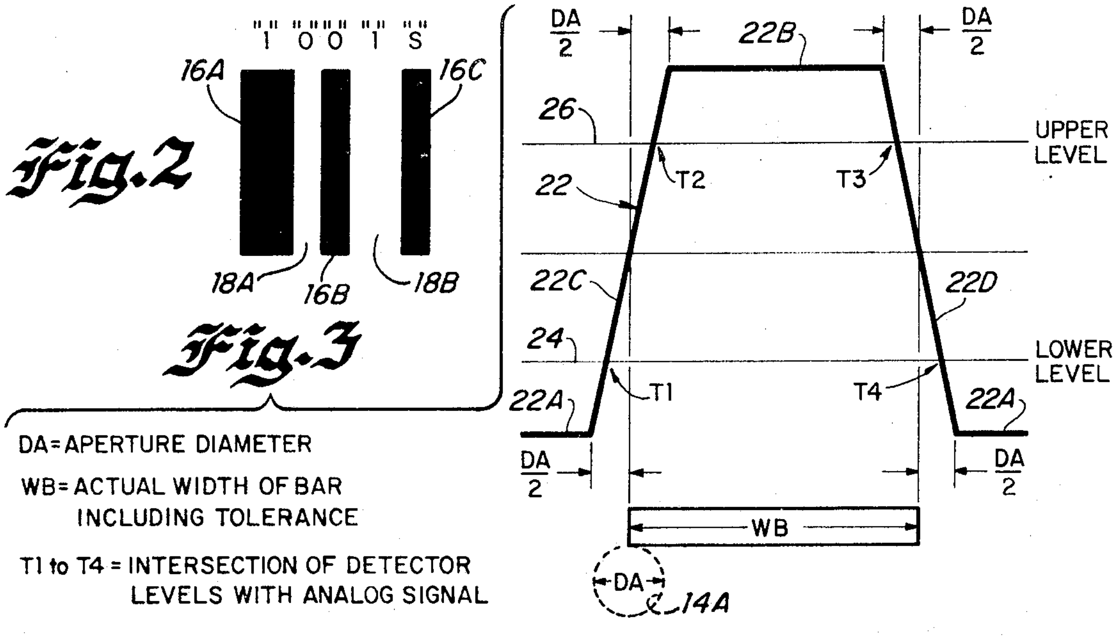
FIG. 2 is a schematic illustration of a code for the digit nine.
FIG. 3 is a typical waveform of an analog signal derived from a code area on a record illustrating the relationship between scanning aperture size, code area width, detecting levels, and analog signal configuration.

The code used in preparing the record 12 can be one of those known in the art, and FIG. 2 of the drawings illustrates one code for the digit nine useful in carrying out the present invention. The illustrated code is a four bit code whose bits are defined by three bars or areas 16A, 16B, and 16C of one characteristic and two intervening bars or spaces 18A and 18B of a different characteristic. In a preferred embodiment, the bars 16A–16C are formed by printing a substantially nonreflective material, such as black ink, on the reflective surface of the record 12 so that the areas, bars, or spaces 18A and 18B comprise the light reflective surface of the record. The different characteristics of the bars 16A–16C and 18A and 18B could also be defined by the use of different materials, such as the presence or absence of magnetic material or materials of sufficiently different light reflecting characteristics.

The encoding technique used in the code illustrated in FIG. 2 is to assign a wide width to the bars 16, 18 to represent a binary 1 and to assign a narrow width to the bar or areas 16, 18 to represent a binary 0. The relative sizes of the wide and narrow widths should be optimized to insure adequate differentiation on interpretation, and in general this is accomplished by maximizing the difference between the wide and narrow widths within the constraints that the narrow bar must be large enough to insure a proper width value entry on interpretation, and the wide width must not be so large as to provide an overflow condition on entering a width value. Another factor to be considered is that an increase in the differentiation between widths generally results in an accompanying loss of bit density or packing on the record, while a reduction in width difference can be used to increase bit density. In one embodiment of the present invention, the narrow width representing a binary 0 was selected to be 0.008 – 0.012 inch, while the wide width was set at 0.020 – 0.024 inch nominal.

A further factor to be considered with regard to the selection of widths for the bars is the printing tolerances which must be maintained to insure accurate record interpretation. Using the values set forth above, accurate differentiation can be obtained with width tolerances of +0.003 inch and −0.001 inch when the speed of relative movement between the record 12 and the reader 14 varies between three and thirty inches per second when using the interpreting system 10 and method of the present invention.

To illustrate the width coding used with the system 10, the code assigned to the numerical character nine (FIG. 2) is 1001. Considered from left to right, these binary bits represent the binary weights 8, 4, 2, and 1, respectively. The binary value 1 in the first and fourth bit positions is denoted by the wide width assigned to the bar 16A and the space 18B. The binary value 0 in the second and third bit positions is represented by the narrow width assigned to the white bar or space 18A and the black bar 16B. The bar 16C is shown as a stop bar and can be of any width. This bar can be width modulated to provide a parity bit for odd or even parity checks or can comprise the first bar 16A of a following character code. The codes for the remaining digits and zero (not shown) can be formed in true binary using the criteria described for the digit nine. The codes can include different numbers of bits and be other than true binary. When the codes are read in forward or reverse direction, the binary significance of the bars and spaces is unchanged, but the order of presentation of the character code is reversed. The message on the record 12 can be preceded by a start code and followed by a stop code which are distinct when read in forward or reverse direction. This permits reverse read codes to be changed in order to correct codes. Such an arrangement of start and stop codes are shown and described in my copending application Ser. No. 157,870, filed June 29, 1971, and assigned to the same assignee as the present application.

Referring now more specifically to FIG. 1, relative movement is produced between the record 12 and the reader 14, as by manually moving the reader 14 across a line such that it intercepts each segment or bar of the encoded message. The reader 14 can be of any suitable type known in the art and generally includes a light source for illuminating the record 12 and a photoresponsive means whose output varies in accordance with reflected light received from the record 14. The output of the reader 14 is coupled to an amplifying and shaping unit 20, the output of which changes between high and low levels on transitions between the black and white bars 16, 18 on the record 12 and the durations of which are proportional to the elapsed time between white and black transitions. Thus, the apparent width of any bar or space as represented by the duration of the high or low level signal at the output of the unit 20 will vary in dependence on the relative speed of movement between the reader 14 and the record 12. The reader 14 is optically coupled to the record 12 through a scanner or scanning aperture 14A (FIG. 3) of a known finite dimension. This scanning aperture 14A provides the reference value during reading of the record 12 against which the apparent widths of the bars or areas 16, 18 are compared to determine 0 or 1 significance.

More specifically, FIG. 3 of the drawings illustrates the effect on the configuration of the waveform of an analog signal 22 supplied from the reader 14 through the unit 20 resulting from the fixed finite size of the scanning aperture 14A. As the aperture 14A enters a black bar 16, the reader output signal rises above a white level portion 22A of the signal 22 until it reaches a black level portion 22B, both of which can be set, for example, by clipping. Because of the finite size or diameter DA of the scanning aperture 14A, the white and black levels 22A and 22B are joined by a segment 22C having a slope proportional to the diameter DA of the aperture 14A. This results from the progressively greater interception of the leading edge portion of the black bar 16 by the optical scanning aperture 14A.

The slope of the portion 22C can be determined by setting lower and upper detection levels 24 and 26, respectively, which are symmetrical with respect to half of the average height or amplitude of the signal 22. This level at half of the average height is a point corresponding to the leading edge of the black bar 16 and offset in opposite direction from the white level 22A and the black level 22B a distance proportional to one-half of the diameter or dimension of the scanning aperture 14A considered in the direction of relative movement between the record 12 and the reader 14. The time elapsed between the intersection of the analog signal 22 with the lower detection level 24 (T1) and the intersection of this signal with the upper detection level 26 (T2) provides a measurement of the slope of the portion 22C.

As the reader 14 leaves the black bar 16 to enter the white bar 18, the analog signal 22 drops from the black level 22B to the white level 22A through a sloping portion 22D on the trailing edge of the black bar 16. The time elapsed between the signal portion 22D — upper level 26 intersection (T3) and the signal portion 22D — lower level 24 intersection (T4) measures the slope of the portion 22D. Since the slopes measured by the times T1 to T2 and T3 to T4 are functions of the constant diameter DA of the scanning aperture 14A, they can be used to establish a reference value against which the widths of the areas 16, 18 can be compared to establish the 0 or 1 significance of these areas. Because of the difference in duration of the slope indicating periods (T2–T1 or T4–T3) and the area width indicating periods (T3–T1 or T4–T2), the width values can be reduced or divided by a constant K or the slope indicating duration can be increased or multiplied by a constant K to permit direct numerical comparison. This constant K is preferably chosen to set the reference value approximately at a mid-point between nominal wide and narrow code area widths.

When the speed of relative movement between the record 12 and the reader 14 increases, the apparent width of the areas 16, 18 decreases, but the slope of the signal portions 22C and 22D also increases so that the times elapsed between T1 to T2 and T3 to T4 decrease to reduce the reference value. The same automatic compensation occurs when the relative speed of movement between the record 12 and the reader 14 is decreased, but in an opposite sense or direction. In addition, a tilt of the reader 14 up to 45° away from a vertical position relative to the record 12 does not introduce reading errors. Further, it should be noted that true width of the areas 16, or with an inverted waveform 22 for areas 18, can be measured between either of the times T1–T3 or T2–T4.

Referring now more specifically to FIG. 1 of the drawings, the system 10 is shown therein in elemental AND and OR logic to simplify the description. Certain well known auxiliary circuits, such as phased clock signal sources for sequencing possible interfering operations occuring on the same circuit event, have not been shown. However, the addition of these known circuits, where desired, and the conversion of the logic elements to TTL logic, for example, is well within the expected skill of a designer familiar with digital logic.

Figure 4:
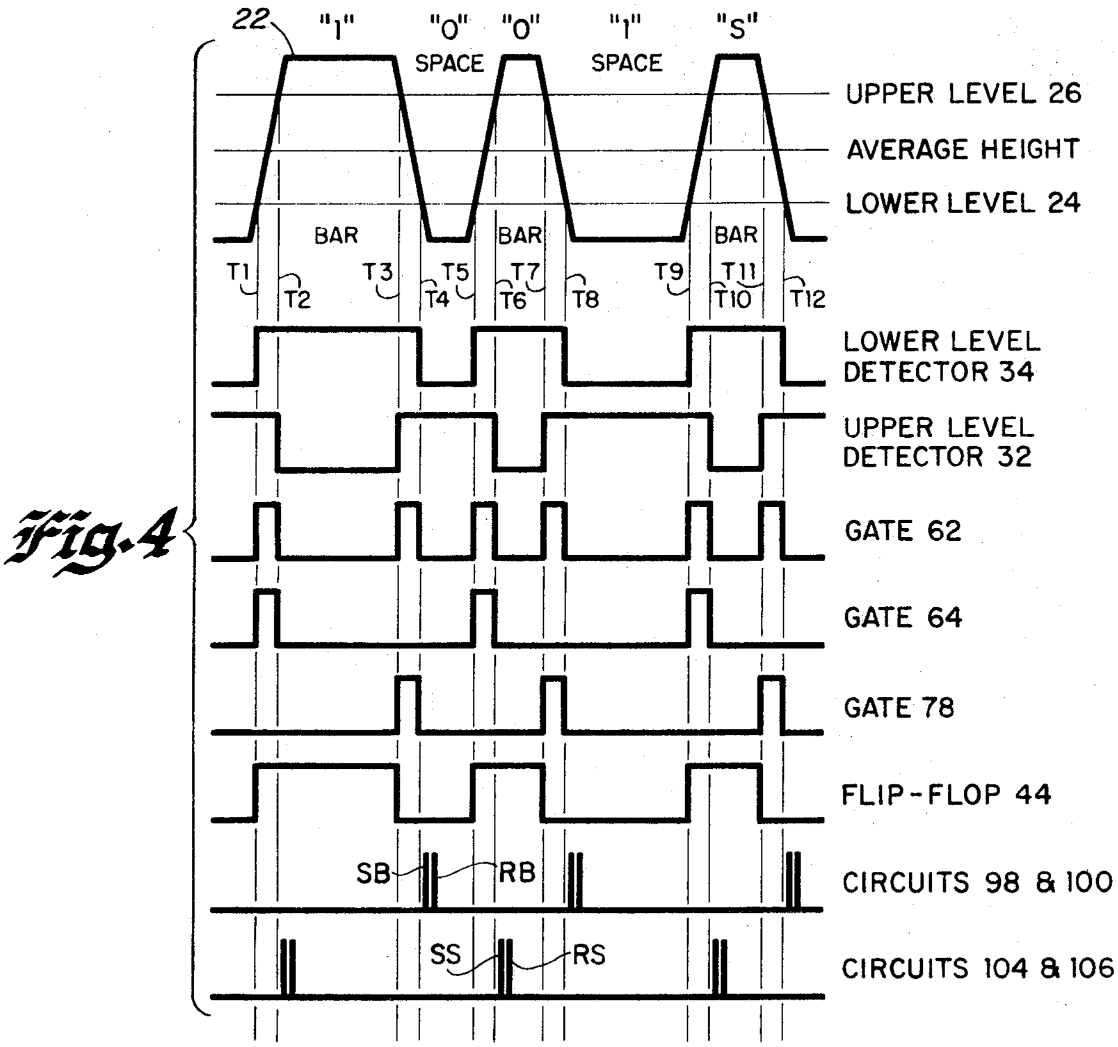
FIG. 4 illustrates certain timing and control signals used in the record reading circuit of the present inveniton.

The measurement of the widths of the bars or areas 16, 18 as well as the generation of a reference width or value is controlled by an average pulse height circuit 30 of known construction, an upper level detector 32, and a lower level detector 34, the inputs of all of which are coupled to the output of the unit 20. The circuit 30 responds to the amplitude of the signals 22 received from the unit 20 and applies a regulated potential varying with the pulse stream received from the unit 20 across a potentiometer 36. The upper level and lower level detectors 32 and 34 are biased by taps to the potentiometer 36 to respond at the levels 26 and 24, respectively, illustrated in the diagram of FIG. 3. In this manner, the position of the levels 24, 26 relative to the black and white levels 22B, 22A are maintained. When the reader 14 is in the white area preceding the first black code area 16A of a coded character, the Q output of the lower level detector 34 is at a low level, and the $\overline{Q}$ output of the upper level detector is at a high level (FIG. 4).

When the system 10 is first placed in operation, as by actuating an on switch, a main reset signal MR is generated to place a mod 6 counter 38 in a reset condition. This counter is used to program the reading and resetting operations of the system 10, and to that end has its parallel outputs supplied to a decoder 40. The decoder 40 provides a reset signal R when the counter 38 is in its reset position and provides an enabling signal E in its other settings. The reset signal R provided by the decoder 40 resets a pair of control flip-flops 42 and 44, a space standard or reference counter 46 in which is stored a reference value for comparison with the widths of spaces or white areas 18A, 18B, a space width counter 48 in which are stored the measured widths of the white spaces or bars 18A, 18B, a bar width counter 50 in which is stored the measured widths of the black bars 16A, 16B, and a bar standard counter 52 in which is stored a reference width value based on the scanning aperture 14A and derived during reading. The reset signals R are applied to the components 46, 48, 50, and 52 through four OR gates 54, 56, 58, and 60.

When the record 12 is to be read, the reader 14 is placed adjacent this record, and relative movement is produced therebetween so that the scanning aperture 14A moves toward the first black bar 16A in the first character encoded on the record 12 which is assumed to be the digit nine. When the scanning aperture 14A has advanced some distance into the first black bar 16A, the signal 22 (FIG. 4) rises to the lower level 24 so that at time T1, the output of the lower level detector 34 rises to a more positive level. Since one input to an AND gate 62 is normally enabled at the output of the detector 32, this signal from the detector 34 completes the enabling of the gate 62 to provide a more positive output potential (FIG. 4). This more positive signal advances the counter 38 a single step so that the decoder 40 removes the reset signal R and provides the enable signal E. The system 10 is now conditioned for interpreting the record 12.

The more positive output of the gate 62 initiates the reading of a reference value for comparison with the width of the first black bar 16A into the bar standard counter 52. More specifically, since the control flip-flop 42 is reset, the more positive output from the gate 62 completes the enabling of a gate 64 so that its output rises to a more positive potential (FIG. 4) to enable one input to an AND gate 66. The other input of this gate is connected to the output of a clock pulse source 68. The output of the enabled gate 66 is coupled to the counting input of the bar standard counter 52. Thus, at time T1, the accumulation of a reference value in the counter 52 is initiated.

To initiate the storage of the width of the first bar 16A in the bar width counter 50, the leading edge of the more positive signal from the gate 62 sets the control flip-flop 44 so that a more positive potential is provided from its Q output (FIG. 4) to one input of an AND gate 70. The other input to the gate 70 is coupled to the clock pulse source 68 through a pulse or signal dividing circuit 72 which divides the clock pulse stream by the constant K. Thus, the accumulation of a bar width value in the counter 50 is initiated at the time T1.

As noted above, the value stored in the standard or reference counter such as the counters 46 and 52 can be set between the wide and narrow width values of the spaces and bars 18 and 16 which are measured by the counters 48 and 50 either by counting directly into the width counters 48 and 50 and multiplying the clock pulse stream into the counters 46 and 52 or by running the clock pulse stream directly into the standard counters 46 and 52 and dividing this pulse stream for application to the input of the counters 48 and 50. The latter expedient is adopted in the system 10 to simplify the circuit design. Accordingly, at time T1 set by the intersection of the waveform of the signal 22 with the lower level 24, the accumulation of the width of the bar in the counter 50 and the accumulation of the reference value in the counter 52 is initiated.

When the amplitude of the signal supplied to the detectors 32 and 34 rises to the upper level, the $\bar{Q}$ output from the upper level detector 32 drops to a low level (FIG. 4) to terminate the enabling of the gate 62 and thus that of the gates 64 and 66. The termination of the enabling of the gate 66 at the time T2 terminates the accumulation of the bar reference width value in the counter 52. The negative-going edge of the signal from the detector 32 is effective through an inverter 74 and an OR gate 76 to set the control flip-flop 42. This removes a further enabling for the gate 64 and provides a more positive space standard enable signal SSE which partially enables an AND gate 78. The system 10 remains in this condition until such time as the scanning aperture 14A on the reader 14 starts to leave the trailing edge of the black bar 16A and enter the initial portion of the white bar or area 18A. When the amplitude of the signal 22 drops to the upper level 26 at time T3 (FIG. 4), the output of the upper level detector 32 again rises to a more positive potential and again completes the enabling of the gate 62 so that its output rises to a more positive potential.

The more positive signal from the gate 62 advances the counter 38 a single step to its second position, but the decoder 40 continues to provide the enabling signal E. The leading edge of the more positive signal from the gate 62 resets the flip-flop 44 to inhibit one input of the gate 70 and to terminate the accumulation of the width of the first black bar 16A in the bar width counter 50. As set forth above, the time interval defined by the times T1–T3 accurately measures the true width of the bar 16A. Thus, the width of the bar 16A is now stored in the counter 50, and the reference value against which this value is to be compared is stored in the bar standard or reference counter 52.

The more positive output from the gate 62 and the resetting of the control flip-flop 44 initiates the storage of the space reference value in the counter 46 and the width of the first white bar or space 18A in the counter 48. More particularly, when the output of the gate 62 rises to a more positive potential, the gate 78 which was previously partially enabled by the signal SSE is fully enabled (FIG. 4) to enable an AND gate 80, the other input of which is coupled to the clock pulse source 68. The output of the gate 80 is connected to the counting input of the space standard counter 46. Thus, this counter begins to accumulate the space reference value at time T3. Further, the resetting of the control flip-flop 44 provides a more positive space width counter enabling signal SWE which enables an AND gate 82, the other input of which is connected to the output of the dividing circuit 72. The output of the gate 82 is coupled to the counting input of the counter 48. Thus, the counter 48 begins to accumulate the measured width of the first space or white bar 18A at the time T3.

As the scanning aperture 14A in the reader 14 moves further away from the first black bar 16A and into the first white area 18A, the level of the signal 22 (FIG. 4) drops to the lower level 24, and the output from the detector 34 drops to a low level. This signal transition terminates the accumulation of the reference value in the space standard counter 46 and reads the results of the comparison of the bar width values previously stored in the counters 50 and 52 into a storage device. More specifically, when the output from the detector 34 drops to a low level, the gate 62 is inhibited to, in turn, inhibit the upper input to the gate 80 (FIG. 4) so that the accumulation of the space reference value in the counter 46 is terminated. The negative-going leading edge of the signal from the detector 34 is also effective through an inverter 84 and the OR gate 76 to reset the control flip-flop 42. This places the level SSE at a low level to provide another inhibit to the gate 78 and partially enables the gate 64 which is inhibited at its other input at the output of the gate 62. Thus, the system 10 is partially enabled for storing the width of the second black bar 16B, and the accumulation of the space reference value in the counter 46 is terminated.

To provide a means for determining the relative values of the measured width stored in the counter 50 and the width reference value based on the diameter DA of the scanning aperture 14A in the reader 14 stored in the counter 52, a conventional adder 86 is provided whose two sets of parallel inputs are coupled to the true or Q outputs of the bar width counter 50 and the false or $\bar{Q}$ outputs of the counter 52. The most significant carry output from the full adder 86 is coupled to one input of an AND gate 88. Since the full adder 86 is provided with the true value standing in the measured bar width counter 50 and the 1's complement of the value standing in the reference counter 52, the full adder 86 effectively subtracts the values standing in the counters 50 and 52. This means that the full adder 86 will supply a more positive signal to the connected input of the gate 88 when the value standing in the measured width counter 50 exceeds the value standing in the reference counter 52 representing a binary 1. Conversely, when the reference value stored in the counter 52 exceeds the width value stored in the counter 50, thus indicating that the first bar 16A is a narrow bar, the carry is consumed in the full adder, and the adder 86 applies a low level signal to the connected input of the AND gate 88. It will be appreciated that a true subtraction can be performed by the adder 86 only when a 2's complement is supplied from the reference counter 52 to the corresponding input to the adder 86. However, because of the large differences in values in the counters 50 and 52 resulting from the use of relatively high speed clock pulses and the margins between the widths of the bars 16 and 18, the error of −1 arising from the use of the 1's complements, as contracted with the 2's complements is not significant.

Since in the representative example for the digit nine the first black bar 16A is of a wide width, the value standing in the counter 50 is greater than the reference value stored in the reference counter 52 and the adder 86 supplies a more positive signal to the connected input of the gate 88. An additional input to this gate is enabled by the enable signal E supplied by the decoder 40. The remaining input to the gate 88 is connected to the output of the upper level detector 32. This signal will be positive to complete the enabling of the gate 88 only during the interval in which space or white bar information is being read by the reader 14. With the gate 88 fully enabled, a more positive signal is forwarded through an OR gate 90 to the input terminal of a shift register 92. An inverter 94 inhibits an AND gate 96 to prevent the appearance of any other information at the input to the OR gate 90 when the output of the adder 86 is being read. Thus, the input to the shift register 92 is now held at a high level from the output of the adder 86 representing the binary 1 encoded by the first black bar 16A on the record 12.

To provide means for shifting this value into the shift register 92 and for subsequently clearing the counters 50 and 52 for storing values determined by the width of the next black bar 16B, a pair of delayed one-shot circuits 98 and 100 are provided. On the negative-going trailing edge of the output from the detector 34 occurring at time T4 (FIG. 4), the circuit 98 provides a slightly delayed shift bar signal SB which is forwarded through an OR gate 102 to shift the value provided by the OR gate 90 into the first stage of the shift register 92. Thus, the results of the reading of the first bar 16A on the record 12 are now stored in the shift register 92. The trailing edge of the signal SB triggers the circuit 100 to provide a brief positive-going reset bar signal RB. This signal is forwarded through the OR gates 58 and 60 to clear the counters 50 and 52.

The system 10 remains in this condition until the scanning aperture 14A in the reader 14 starts to enter the black bar 16B and the level of the signal 22 rises up to the lower level 24. At this time, the output of the lower level detector 34 again becomes more positive to fully enable the gate 62. The more positive output from the gate 62 advances the counter 38 a third step, but the decoder 40 maintains the enable signal E at its high level, and the more positive signal provided at the output of the gate 62 also controls the gates 64 and 66, the control flip-flop 44, and the gate 70 to again start the storage of the width of the second bar in the counter 50 and the next bar reference value in the counter 52. In addition, when the control flip-flop 44 is set (FIG. 4), the signal SWE drops to a low level to inhibit the gate 82, and the accumulation of the width of the first white bar or space 18A in the counter 48 is terminated. Thus, the counter 48 is effective to measure the width of the first white space or bar 18A in the interval between T3 and T5 (FIG. 4) which is a true measure of its width. This width could be measured, however, in the interval between T4 and T6.

At the time T6 when the waveform or signal 22 reaches the upper level 26, the output of the detector 32 drops to a low level to terminate the storage of the value in the counter 52. This negative-going signal triggers a pair of delayed one-shot pulse generators 104 and 106 to effect the transfer of the results of the width evaluation of the first white bar 18A into the shift register 92 and to clear the registers 46 and 48. More specifically, the space reference counter 46 and the space width counter 48 are coupled to a full adder 108 in the same manner that the adder 86 is coupled to the counters 50 and 52. The output of the adder 108 is coupled to one input of the AND gate 96. Thus, this AND gate will receive a more positive signal when the measured width value stored in the counter 48 exceeds the reference value stored in the counter 46 and a low level value when the measured width stored in the counter 48 is less than the reference value stored in the counter 46. In the assumed example, the first white bar 18A is narrow so that the value standing in the counter 48 is less than the reference value stored in the counter 46. Thus, one input to the AND gate 96 is inhibited. Another input is enabled by the inverter 94 because the output of the detector 32 is now at a low level. The remaining input is enabled by the signal E. Thus, a low level signal is forwarded through the OR gate to the input of the shift register 92 representing a binary 0.

When the circuit 104 is triggered by the negative-going edge of the signal from the upper level detector 32 at time T6, a momentary positive-going shift space signal SS is provided which is forwarded through the OR gate 102 to shift the contents of the shift register 92. This transfers the binary 1 previously stored in the first stage into the second stage and shifts a binary 0 representing the results of the current comparison into the input stage. The trailing edge of the signal SS triggers the second circuit 106 to provide a reset space signal RS. This signal is forwarded through the OR gates 54 and 56 to reset the counters 46 and 48. Thus, the first two binary bits in the character message have been translated from the record 12 and stored in the shift register 92.

During continuing relative movement between the reader 14 and the record 12, the storage of the width of the second black bar 16B is completed by time T7 (FIG. 4), and a binary 0 is shifted into the shift register 92 following time T8 when the amplitude of the signal 22 drops below the lower level 24. In the interval between T7 and T8, the next space reference value is stored in the counter 46, and the measured width of the second space 18B is stored in the counter 48 between times T7 and T9. At time T9, the reader aperture 14A of the reader 14 enters the stop bar 16C so that immediately following time T10 a binary 1 decoded from the wide white space 18B is shifted into the input stage of the shift register 92. At this time all four bits of the character message are stored in the shift register 92.

At time T11, when the reader aperture 14A of the reader 14 starts to leave the stop bar 16C, the output of the gate 62 becomes positive for the sixth time during the message interpretation, and the counter 38 is advanced to its reset position so that the enabling signal E drops to a low level and the reset signal R rises to a more positive level. This more positive signal resets all of the counters 46, 48, 50, and 52 and resets the control flip-flops 42 and 44. The reset signal R also enables an output unit 110 to read in the parallel output from the shift register 92 so that the decoded message is transferred to the output or utilization device 110. In addition, since the enabling signal E is dropped to a low inhibiting level, further data cannot be transferred through the OR gate 90 into the shift register 92, thus preventing any alteration in the contents of the shift register 92 possibly arising from the signal SB triggered following the time T12 when the analog signal 22 last drops below the lower level 24.

Successive characters of the message on the record 12 can be interpreted or translated in the manner described above. In addition, it is possible to use the system 10 by the removal of the space counters 46 and 48 and their associated controls and using only black bars 16A–16C which are width modulated with intervening white bars or spaces which are not modulated. Alternatively, the system 10 can be used with width modulated white bars or spaces 18A, 18B using standard black lines 16A–16C as means for delineating the widths of the white bars 18A and 18B. Obviously, the number of bars required when only one or the other of the areas of different characteristics is modulated with intelligence reduces bit packing density on the record 12.

In a representative system 10 of the type described above using a record 12 with wide bars or areas in the range of from 20 to 24 mils and narrow bars or areas in the range of 8 to 12 mils, the reader 14 can be provided with a scanning aperture 14A of 6 mils. This 6 mil opening is adjusted to an effective scanning aperture of a lesser size by the setting of the lower and upper levels 24, 26. For example, the counters 46 and 52 are effective to accumulate standard values during the intervals T3–T4 and T1–T2, respectively, and the effective width of the opening 14A represented thereby can be set or reduced to be around 4 mils.

To provide proper record interpretation, the width of the scanning aperture 14A should be equal to or preferably less than the narrowest area 16, 18, and this is satisfied by the values set forth above. To provide unambiguous area width interpretation in the system 10 where the constant K is used as a width value divisor rather than a standard value multiplier, the effective width of the opening 14A, as defined by the detecting levels 24, 26, i.e., 4 mils, must be less than the quotient of the narrowest wide area and the constant K (a binary 1) and greater than the quotient of the largest narrow area and the constant K (a binary 0). Further, it is desirable that the constant K be an integer in order to simplify pulse stream division.

With the smallest wide area 16, 18 having a width of 20 mils and the largest narrow area 16, 18 having a width of 12 mils, a constant K having a value of 4 would provide a smallest wide area count in the counters 48, 50 representing a width of 5 mils and a largest narrow area count in these counters representing a width of 3 mils. With the standard value stored in the counters 46, 52 representing an effective aperture width of 4 mils as set forth above, the worst case narrow area (3 mils) is accurately interpreted as a binary 0 and the worst case wide area (5 mils) is accurately interpreted as a binary 1. Binary division is easily accomplished with a constant K value of 4.

Although the present invention has been described with reference to a single illustrative embodiment thereof, it should be understood that numerous other modifications and embodiments can be devised by those skilled in the art which will fall within the spirit and scope of the principles of this invention.

What is claimed and desired to be secured by Letters Patent of the United States is:

1. A method of reading a record having code elements of different sizes with a reader having an optical scanning aperture of a known dimension which comprises the steps of producing relative movement between the record and the reader so that the aperture passes over the code elements, establishing a first value in dependence on the interception of the code elements by the aperture and determined by the known dimension of the aperture, establishing a second value in dependence on the width of the code element determined by the relative movement between the reader aperture and the record, and
comparing the first and second values to establish a code value.

2. A method of interpreting a record encoded with binary values by means of code areas of different widths using a reader with a known optical scanning aperture which comprises the steps of
producing relative movement between the record and the reader to cause the aperture to pass over the areas,
storing a first value in dependence on the time duration of the period during which the aperture intersects an edge of a code area,
storing a second value in dependence on the time duration of the period during which the aperture is passing across the width of a code area, and
comparing the first and second values to establish a binary value.

3. A method of interpreting records encoded with code areas of different sizes using a reader with a scanner of a known dimension, which method comprises the steps of
producing relative movement between the record and the reader so that the scanner passes across the code areas,
registering a first value determined by the dimension of the scanner as the relative movement is produced between the reader and the record,
registering a second value determined by the size of a code area as relative movement is produced between the record and the reader, and
comparing the first and second values to establish a code value.

4. A method of interpreting records encoded with discrete code areas of different sizes defined by edges using a reader with a scanner of known dimension, which method comprises the steps of
producing relative movement between the record and the reader to cause the areas to pass across the scanner,
producing a signal resulting from the relative movement between the scanner and a code area, said signal having both a sloping portion dependent on the intersection of the edge of a code area by the scanner of known dimension and a width portion dependent on the size of the code area,
registering a first value in dependence on the sloping portion of the signal,
registering a second value in dependence on the width portion of the signal, and
establishing a code value in dependence on the registered first and second values.

5. An apparatus for interpreting records encoded with code areas of different sizes representing different code values which comprises
a reader having a scanning portion of a known dimension, the record and the reader being movable relative to each other so that the scanner passes across the code areas,
first and second storage means,
a first control circuit controlled by the reader and coupled to the first storage means for storing in the first storage means a value determined by the dimension of the scanner as relative movement is produced between the record and the reader,
a second control circuit controlled by the reader and coupled to the second storage means for storing in the second storage means a value determined by the size of a code area as relative movement is produced between the record and the reader, and
a third control circuit coupled to the first and second storage means for establishing a code value in dependence on the values stored in the first and second storage means.

6. An apparatus for interpreting records encoded with code areas of different sizes representing different code values which comprises
a reader having a scanner of a known dimension, the reader and the record being moved relative to each other so that the scanner is passed across the code areas,
first means coupled to and controlled by the reader for providing a code area representing signal as the scanner moves across a code area, said signal having a sloping edge due to the dimension of the scanner,
signal amplitude responsive means coupled to the first means and controlled by the sloping edge of the signal for determining the slope of said signal,
first storage means controlled by the signal amplitude responsive means for storing a first value determined by said slope,
second storage means controlled by the reader for storing a second value dependent on the size of the code area, and
a control circuit controlled by the stored first and second values for establishing a code value.

7. An apparatus for interpreting a record encoded with elongated areas of different width representing different code values which comprises
a reader with an optical scanning aperture of known dimension, the reader and the record being moved relative to each other so that the aperture passes over the code areas transverse to their direction of elongation,
circuit means coupled to the reader and responsive to the aperture passing over the code areas to provide code area representing signals having a sloping portion determined by the dimension of the aperture and a width representing portion determined by the width of the code areas,
first means coupled to the circuit means for establishing a first value determined by the sloping portion of the signal,
second means coupled to the circuit means for establishing a second value determined by the width representing portion of the signal, and
means responsive to the relative values of the first and second values for establishing a code value.

8. The apparatus set forth in claim 7 in which the first means includes
first and second signal amplitude responsive means supplied with the code area representing signal and providing first and second level representing signals when the amplitude of the code area representing signal is at two different levels, and
gate means controlled by the first and second level representing signals for providing a slope signal representing the sloping portion of the signal.

9. The apparatus set forth in claim 8 including
a counter,
a clock signal source, and means controlled by the slope signal for controlling the operation of the counter by the clock signal source to establish said first value.

10. The apparatus set forth in claim 9 in which the second means includes an additional counter, and gate means controlled by the width representing portion of the code area representing signal for controlling the operation of said additional counter by said clock signal source.

11. The apparatus set forth in claim 10 including a clock pulse dividing circuit coupled between the clock pulse source and said additional counter.

* * * * *